United States Patent [19]

Tanii

[11] Patent Number: 5,575,426
[45] Date of Patent: Nov. 19, 1996

[54] PROCESS FOR DISPOSING RAW CONCRETE SLUDGE, APPARATUS FOR DISPOSING THE SAME, AND AGGREGATE FORMING APPARATUS USING THE SAME SLUDGE

[75] Inventor: Kiyoshi Tanii, Kumamoto-ken, Japan

[73] Assignee: Tanii Industries Co., Ltd., Japan

[21] Appl. No.: 538,923

[22] Filed: Oct. 4, 1995

Related U.S. Application Data

[62] Division of Ser. No. 361,771, Dec. 22, 1994.

[30] Foreign Application Priority Data

| Dec. 29, 1993 | [JP] | Japan | 5-355200 |
| Dec. 29, 1993 | [JP] | Japan | 5-355228 |
| Apr. 5, 1994 | [JP] | Japan | 6-101671 |
| Jun. 17, 1994 | [JP] | Japan | 6-169920 |

[51] Int. Cl.$^6$ .................................. B02C 19/12
[52] U.S. Cl. .................. 241/3; 241/15; 241/22; 241/101.8; 241/DIG. 38
[58] Field of Search ............... 241/3, 15, 22, 241/27, 79.1, 101.8, DIG. 38

[56] References Cited

U.S. PATENT DOCUMENTS

| 4,046,582 | 9/1977 | Kawamura et al. . |
| 4,127,478 | 11/1978 | Miller . |
| 4,154,671 | 5/1979 | Borges . |
| 4,192,745 | 3/1980 | Hood . |
| 4,964,917 | 10/1990 | Bobrowski et al. . |
| 5,091,083 | 2/1992 | Meylor et al. . |
| 5,127,740 | 7/1992 | DeBoer . |
| 5,178,455 | 1/1993 | Ohsaki et al. ......................... 366/6 |
| 5,203,512 | 4/1993 | Ferraris et al. ........................ 241/16 |
| 5,215,585 | 6/1993 | Luthra et al. . |
| 5,279,465 | 1/1994 | Stroppiana ............................ 241/29 |
| 5,305,888 | 4/1994 | Meylor et al. . |
| 5,312,051 | 5/1994 | Preisser . |
| 5,427,617 | 6/1995 | Bobrowski et al. . |

Primary Examiner—John M. Husar
Attorney, Agent, or Firm—Price, Heneveld, Cooper DeWitt & Litton

[57] ABSTRACT

Aggregate is separated from sludge consisting of, what is called, "the residual raw concrete" remaining in a raw concrete mixing truck from which raw concrete has been discharged, and waste water resulting from washing the mixing truck. Then, the air is forced into the sludge to form bubbles. A chemical admixture in the sludge is allowed to adhere to the bubbles, and an admixture coating within the sludge is destroyed, thereby promoting the hydration of the cement. Subsequently, the resultant sludge is dehydrated to obtain a dehydrated cake of high hardness. Powder formed of the same quality of the cake is spread over the cake, which is then cured for a few hours. The resultant cake is then crushed so that granular aggregate can be formed.

4 Claims, 6 Drawing Sheets

PROCESS FOR DISPOSING RAW CONCRETE SLUDGE, APPARATUS FOR DISPOSING THE SAME, AND AGGREGATE FORMING APPARATUS USING THE SAME SLUDGE

This is a division of application Ser. No. 08/361,771, filed Dec. 22, 1994 now pending.

BACKGROUND OF THE INVENTION

1. Field of the Invention

The present invention relates to a process for disposing raw concrete sludge, an apparatus for disposing such sludge, and an apparatus for forming aggregate from such sludge. More particularly, the invention relates to a process for disposing raw concrete sludge whereby aggregate is separated from, what is called, "residual raw concrete" remaining in a concrete mixing truck from which a predetermined amount of raw concrete has been discharged for use, and waste water resulting from washing the mixing truck (such residual raw concrete and waste water are hereinafter referred to as "the sludge" in this invention), and the sludge which has thus been separated from the aggregate is disposed. The invention also relates to an apparatus for obtaining the aggregate from the resultant sludge.

2. Description of Related Art

Conventionally, a chemical admixture (hereinafter simply referred to as "the admixture") is used for raw concrete to improve its quality. The admixture is one type of surfactant which acts to reduce the amount of water and to circulate together with air. Such an admixture can be divided into two types. One type of admixture acts to allow cement particles to be dispersed in water so as to improve hydration effects, thereby promoting the solidification of cement. The other type of admixture acts to be adsorbed to the cement particles so as to prevent the initial stage of hydration, thereby delaying the solidification of cement.

Immediately after being generated, the sludge, such as the residual raw concrete, is often affected by such an admixture so that the cement particles are dispersed in water so as to be emulsified. Accordingly, when such sludge is dehydrated on the same day, the filter cloth used during dehydration is likely to be quickly clogged with the cement particles, thus significantly hampering dehydrating characteristics. In order to avoid such a problem, the sludge is generally left in an agitation storage vessel (not shown) for approximately ten hours and is then dehydrated the following day. However, if dehydration is performed after a lapse of many hours, the hydration reaction of the cement has gone far ahead, thus deteriorating the agglomeration force of the cement particles. The resultant cement is soft and difficult to handle, thus causing pollution if it is set aside.

As described above, the dehydrated cake which has undergone dehydration the following day exhibits in a weak agglomeration force. Since no development has been made for measures for recycling such dehydrated cakes, there is no choice but to dispose them as restricted industrial waste. However, it is difficult to ensure a disposal site, and the cost of disposal is consequently very high. In order to solve the above problems, a dehydration process should be performed before the cement loses its agglomeration force immediately after the sludge is generated, thus obtaining the resultant hard cake, which can be recycled, thereby saving a large amount of cost.

However, even though the above problem is overcome to obtain the hard cake of high strength, such cakes are deposited in a conventional manner so as to result in a massive rock-like shape, which is time-consuming and requires great efforts to destroy.

Further, the direct and immediate processing of the dehydrated cake without being cured produces a strong adhesion of the cement water to the apparatus, which leads to the malfunctioning of the apparatus. Thus, it is difficult to put the foregoing process for disposing raw concrete sludge into practical use.

SUMMARY OF THE INVENTION

Accordingly, an object of the present invention is to provide a process for disposing raw (uncured) concrete sludge and an apparatus for disposing such sludge, thereby obtaining dehydrated cake of high strength.

Another object of the present invention is to provide an apparatus which is capable of forming easily-handled granular aggregate without permitting the dehydrated cake to stick to the apparatus, or the like.

In order to achieve the above objects, the present invention provides a process for disposing raw concrete sludge employed whereby a dehydrated cake of high strength can be obtained from the sludge, the process comprising the steps of: supplying raw concrete sludge to a pretreatment vessel so as to store the sludge therein; supplying air into the sludge so as to form a plurality of bubbles; allowing an admixture contained in the sludge to adhere to the plurality of bubbles; promoting the hydration of cement due to a synergistic effect of removing the plurality of bubbles from the sludge, the bubbles having the admixture adhering thereto, and destroying an admixture coating within the sludge by the bubbles; and dehydrating the sludge.

The pretreatment vessel has a capacity corresponding to the disposal amount of the sludge in one cycle of dehydration. Such a vessel has an agitation function and also allows the cement to have a duration required for the hydration reaction caused by the bubbles.

The plurality of bubbles having the admixture adhering thereto may be removed by collecting the bubbles which have reached the top surface of the sludge.

The sludge may be supplied to the pretreatment vessel by a sand pump which is vertically movable within a sludge vessel for storing the sludge, the sludge vessel being arranged corresponding to the pretreatment vessel.

The sludge vessel may receive the sludge supplied from a separator which separates aggregate from the raw concrete, the separator being arranged corresponding to the sludge vessel.

The present invention also provides an apparatus for disposing raw concrete sludge comprising: a pretreatment vessel for storing raw concrete sludge; a sludge supply device for supplying the sludge to the pretreatment vessel; an air supply device for supplying air into the sludge stored in the pretreatment vessel so as to form a plurality of bubbles; a removal device for removing the plurality of bubbles formed by the air supply device from the sludge; and a dehydrator for dehydrating the resultant sludge having the bubbles removed therefrom.

The sludge vessel may communicate with a separator which separates aggregate from the raw concrete, the separator being arranged corresponding to the sludge vessel.

The pretreatment vessel may comprise an agitator for agitating the sludge.

The removal device may be a collecting mechanism for collecting the bubbles floating on the top surface of the sludge.

The air supply device may be a hermetic hollow member having a plurality of holes and may be communicated with the agitator and also with an pressurizing air supply device.

The sludge supply device may comprise a sand pump arranged to be vertically movable within the sludge vessel for storing the sludge.

Among the foregoing admixtures, agents for dispersing cement particles in water so as to improve the hydration action, that is, what is called, "the water reducing agents", generally have an anionic type and a non-ionic type.

A lignin-type water reducing agent of the anionic type is mixed into the sludge so as to cause mutual repulsion among cement particles, which are then dispersed in water, thereby allowing a large number of cement particles to react with water and facilitating a sufficient hydration.

On the other hand, a hydroxycarboxylic acid water-reducing agent is adsorbed to the cement particles so as to prevent the initial stage of the hydration of the cement, thereby inhibiting the gelation and delaying the solidification of the cement.

As is seen from the foregoing description, attention has been given to the fact that the admixtures permit cement particles to be dispersed in water, while it acts to cover the cement particles therewith but not combined with the cement particles.

The above-noted technique of mixing and removing an admixture is employed as follows. Fine air particles are mixed into the sludge so as to produce bubbles, and accordingly, an admixture floats to the surface of the sludge with the bubbles. The removal of the bubbles has a double effect of removing the bubbles and destroying a residual admixture coating covering the cement in the sludge.

Further, the following technique is employed in the present invention whereby a solution containing bubbles is reused by mixing it into kneading water for raw concrete and whereby filtration water resulting from the dehydration is reused for disposing the residual concrete and washing the inside of the concrete mixing truck.

The following technique is also employed whereby the sludge is transferred to the pretreatment vessel while vertically moving the suction inlet at all times, thereby enhancing uniform concentration of the sludge.

The present invention further provides a dehydrated cake disposing apparatus comprising: a cutter for slicing a dehydrated cake, the cutter being arranged below a dehydrator for dehydrating raw concrete sludge; a transfer device for transferring the dehydrated cake, the device being arranged below the cutter; and a powder spreader arranged to correspond to the position of the dehydrated cake located by the transfer device. Aggregate can be formed from the raw concrete sludge with such a dehydrated cake disposing apparatus.

The transfer device may be adapted to move forward for two strokes and to move backward for one stroke.

The present invention still further provides a process for disposing a dehydrated cake, comprising the steps of: dropping a dehydrated cake obtained by dehydrating sludge in a dehydration process onto a belt conveyer; slicing the dehydrated cake by a cutter in a raised state on the belt conveyer so as to form it in bar-like pieces; and spreading cake powder over both surfaces of the dehydrated cake by a spreader, the cake powder being formed of the same quality as the dehydrated cake so that the bar-like pieces are prevented from melting and sticking to each other.

Such coating means spreads the cake powder on the belt conveyer by reciprocating the conveyer. The belt conveyer then moves backward, and the dehydrated cake is sliced and laid on the belt conveyer. The belt conveyer is again transferred under the spreader so that the cake powder can be spread over the dehydrated cake.

The present invention still further provides an apparatus for forming aggregate from raw concrete sludge, comprising: a storage vessel for temporarily storing a dehydrated cake which has been dehydrated and coated with cake powder therein; a ribbon screw conveyer for crushing and transferring the cake; a cutter for cutting the dehydrated cake, the cutter being arranged at the rear end of the ribbon screw conveyer; a powder spreader arranged in a stage subsequent to the cutter; and a trommel arranged in a stage subsequent to the powder spreader.

The dehydrated cake formed as described above and coated with the cake powder is temporarily cured in a storage vessel for a few hours so as to proceed with the hydration to such an extent that the cake does not stick to the apparatus or the other components. In such a state, the resultant cake is transferred while being crushed and is rolled into a generally spherical shape. The cake pieces in a rock-like shape are cut again by the cutter arranged in a stage subsequent to the ribbon screw conveyer. The resultant cake granules are transferred to the trommel while being coated with the cake powder by the spreader so that they can be prevented from sticking to each other. The cake granules are further subjected to a transformation into a spherical shape and the removal of fine particles therefrom. The resultant aggregate is then classified.

DESCRIPTION OF THE PREFERRED EMBODIMENT

A description will now be given of an embodiment of process steps of the present invention with reference to the drawings.

Figure 1:
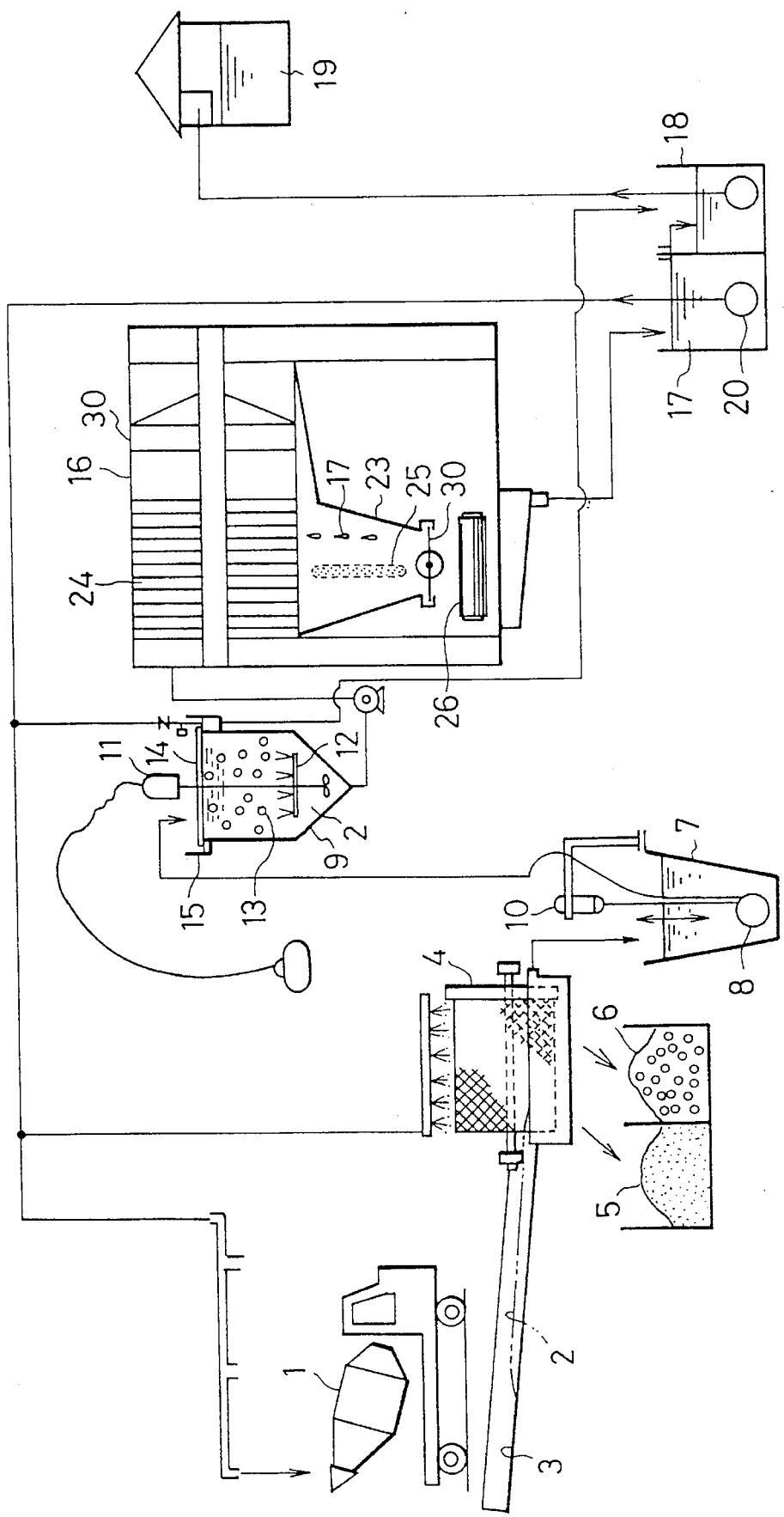
FIG. 1 is a schematic view illustrative of a process for disposing raw concrete sludge, an apparatus for disposing such sludge, and an apparatus for forming aggregate from the resultant sludge according to an embodiment of the present invention.

Referring to FIG. 1, raw concrete brought from a construction site and sludge 2 resulting from washing the inside of the mixing truck 1 are discharged into a mixing truck gutter 3 so as to flow into a trommel 4 (a separator) which is arranged downstream of the gutter 3. Sand 5 and gravel 6 are separated from the sludge 2 in the trommel 4. The sludge 2 is supplied to a sludge vessel 7 and is further supplied to a pretreatment vessel 9 by a sand pump 8.

The sand pump 8 hangs from a lift 10 in order to suck the sludge 2 by turns from the respective water-depth layers of the sludge vessel 7. An agitator 11 is provided for the pretreatment vessel 9. An air diffuser 12 injects air into the sludge 2 within the pretreatment vessel 9 and a collector 14 allows the sludge 2 to flow into a U-shaped groove 15 so as to remove bubbles 13 floating on the surface of water. The aqueous solution containing the bubbles 13 is collected in a tank 18 and is diverted for the use of kneading water 19 for the raw concrete. Filtration water 17 from a dehydrator 16 is further recycled to the start of the process by a filtration water pump 20 so as to be reused for various purposes, such as disposing, what is called, "the residual concrete" and washing the concrete mixing truck 1. It can also be reused as washing water for the trommel 4.

In the present invention, fine air particles are mixed into the sludge 2 as described above, and accordingly, an admixture accompanies the bubbles so as to be floated therewith. The removal of the bubbles has a double effect of removing the bubbles and destroying the residual admixture. The functions of the admixture are thus removed so as to promote the mutual agglomeration of cement particles in the sludge so that the agglomerated cement is able to be dehydrated after a lapse of a suitable duration required for the hydration reaction. The aqueous solution which has liquefied the bubbles is reused by mixing it into the kneading water for the raw concrete.

The water content of the thus-obtained dehydrated cake conspicuously differs from that of a conventional cake which is dehydrated the following day. Originally, the water content required for the cement to be dehydrated and solidified should be thirty-odd % (twenty % of water required for hydration and ten-odd % of water required for agglomeration). However, if dehydration is performed the following day, which process is generally rendered, the hydration reaction for the cement has gone far ahead, which cement has already been emulsified, thus accordingly making it difficult to be dehydrated. The content of residual water in such cement is generally high, as much as 40% or higher, thereby providing very low compressive strength for the resultant dehydrated cake.

In contrast thereto, the water content of the dehydrated cake obtained by the process of the present invention is low, such as twenty-odd %. Even though the water incorporated into the cement by the hydration reaction by the time dehydration is performed is taken into account, the water in the dehydrated cake of the present invention is considerably reduced in comparison with that of a conventional dehydrated cake, which ratio is approximately 50:50 of water to cement, prepared by a typical process. As a result, the resultant dehydrated cake has remarkable compressive strength as indicated in the following Table 1.

The present invention is thus largely characterized by the following features.

The properties of an admixture which is easily adsorbed into the air is utilized. There are provided novel means for destroying an admixture coating created within the sludge by bubbles. Giving attention to the fact that dehydration characteristics of the cement sludge water depends on the duration for the agitation and the hydration reaction, a pretreatment vessel is arranged to act to adjust such duration.

The sand pump, which is a lift-type means for feeding the sludge from the sludge vessel to the pretreatment vessel, inhibits a disparity of the concentration of the sludge depending on the cycle of the dehydration process, thereby making the advantages obtained in the pretreatment step more effective.

Table 1 shows the measurements of the compressive strength of the dehydrated cake obtained by the process of the present invention and the conditions for such measurements.

| Strength test on dehydrated cake according to calculation table made by company A Obtained from cake sample C | Set up the same conditions as those for concrete brought back from a construction site Conditions for concrete mixed in a raw concrete site before performing a hydration process | Raw concrete purchased for this experiment Supplied from a raw concrete site of company A Conditions for concrete mixing and producing | |
|---|---|---|---|
| Sampled date | Sample No. | Age (day) | Strength kg/cm² | Concrete materials were mixed in the raw concrete site, and at the time | Symbol depending on the type of concrete | Standard |
| Nov. 27, 1993 | 1 | 7 | 408 | after a lapse of 3 hours, washing water was mixed to the concrete materials to form a sludge having a specific gravity of 1.15. | Nominal strength (SL) Slump Ratio of water to cement | 240 kg/cm² 18 cm 54% |
| Nov. 27, 1993 | 2 | 7 | 329 | The sludge was intermittently agitated for 30 minutes. | Admixture | high-performance Chupol HP-8 |
| Apr. 27, 1994 | 3 | 9 | 491 | Then, the resultant sludge was dehydrated according to a dehydration process of the present invention. | (Standard mixing) A mixture of cement, water and admixture. Aggregate is excluded for convenience's sake. | |
| Apr. 27 1994 | 4 | 9 | 493 | Water content of the cake samples | | |
| | | | | 1    18% | | |
| | | | | 2    22% | | |
| | | | | 3    20% | | |
| | | | | 4    20% | | |

As is clearly understood from the foregoing detailed description, the concentration of the sludge is averaged so that the process steps in every cycle can be simplified.

Consequently, whenever the sludge is generated, it can be directly dehydrated, thereby significantly shortening the duration required for the hydration reaction of the cement, and enabling a reduction in the water content of the resultant dehydrated cake. In addition to the above-mentioned advantages, the filtration water resulting from dehydrating the sludge from which has had the admixture removed is used as washing water, thereby giving the advantage of decreasing the amount of calcium dissolved in the water. This significantly improves the strength of the dehydrated cake, which is thus reusable, thereby leading to a considerable cost reduction of the dehydrated cake which otherwise should be disposed as industrial waste and to an improvement in cost efficiency. This further results in a contribution to the prevention of pollution in local areas.

Figure 2:
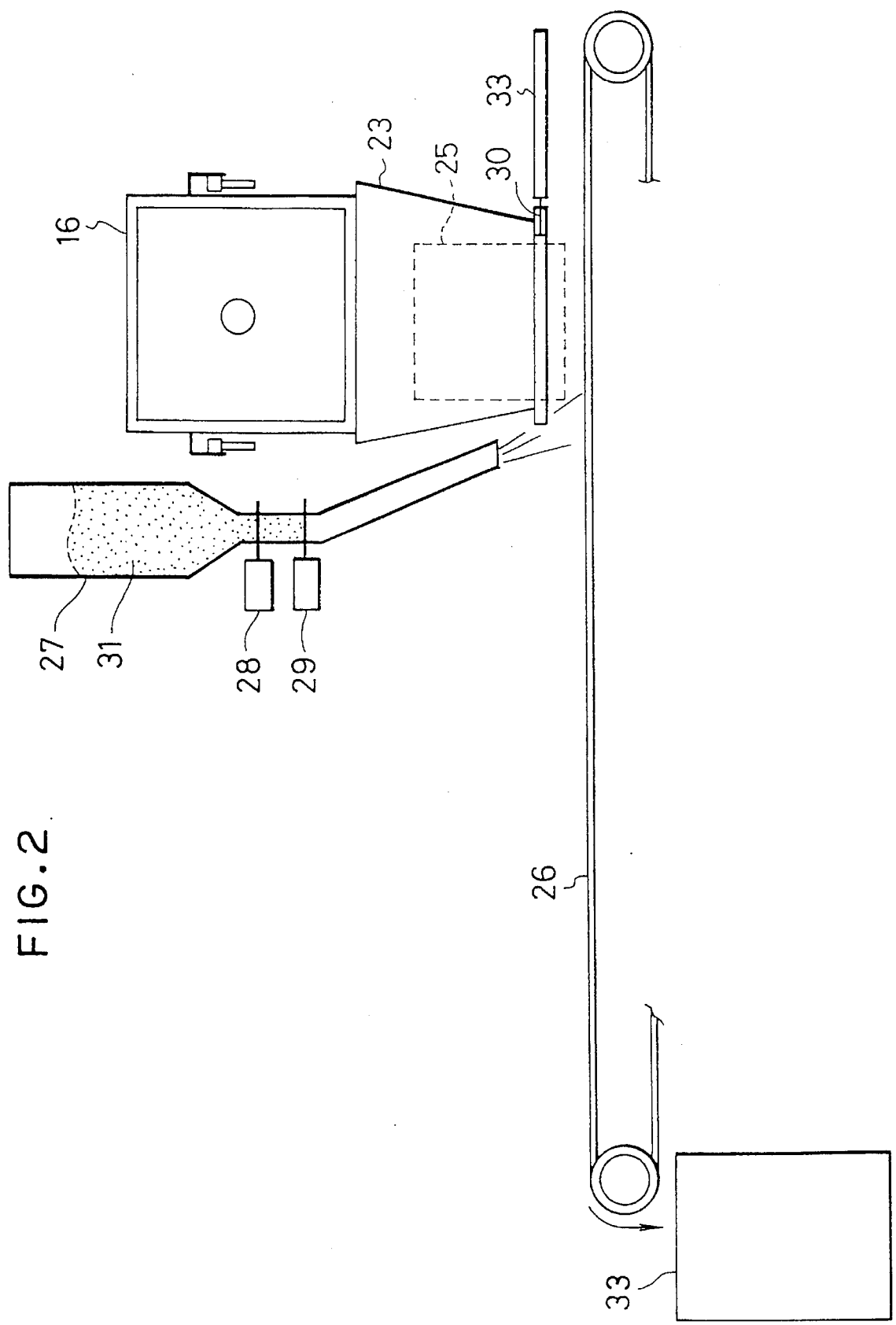
FIG. 2 illustrates a detailed portion of the apparatuses shown in FIG. 1.

A subsequent step followed by the removal of the cake which has been dehydrated by the dehydrator 16 is performed by an apparatus illustrated in FIG. 2. An upward-slope belt conveyer 26 is arranged downward a cake-receiving hopper 23 so that a dehydrated cake 25 can be dropped under the belt conveyer 26 from each filtration chamber 24 via the cake-receiving hopper 23. The belt conveyer 26 is adapted to operate by the following conditions. One stroke is determined as a length 32 occupied by the dehydrated cake 25 dropped onto the belt conveyer 26. The belt conveyer 26 moves forward for two strokes and backward for one stroke, which movement is determined as one cycle. The belt conveyer 26 thus continuously performs the movement of one cycle every time the dehydrated cake 25 drops onto the belt conveyer 26. A spreader 27 for spreading cake powder is arranged upward of the belt conveyer 26 onto which the dehydrated cake 25 is dropped. The spreader 27 is operated in cooperation with the movement of the belt conveyer 26 so as to spread the cake powder all over the width of the belt to the limit in a bar-like shape. Two stages of dampers 28 and 29 are further provided for the spreader 27 in order to spread a predetermined amount of powder in every one cycle of the movement of the belt conveyer 26. The amount contained in the two stages of dampers 28 and 29 are adapted to match the amount of powder supply in one cycle. A cutter 30 is arranged at the bottom of the cake-receiving hopper 23 to slice the dehydrated cake 25 dropped onto the belt conveyer 26 into a plurality of pieces.

Figure 3:
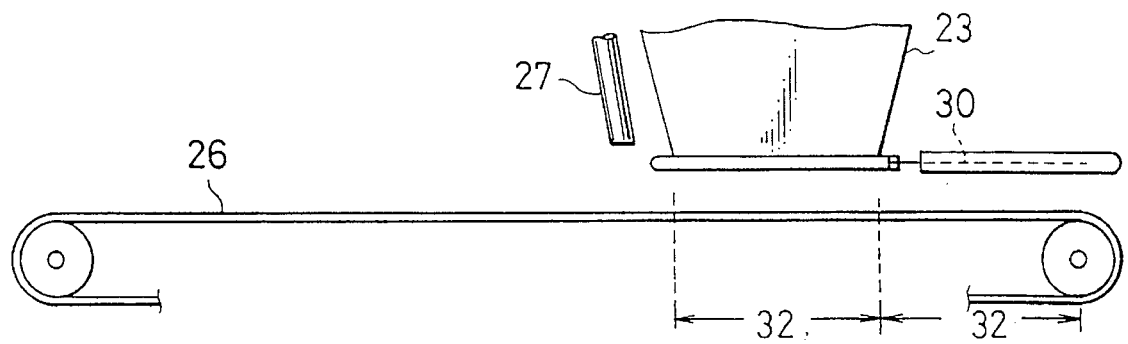
FIG. 3 illustrates a process step of the operation performed by the aggregate forming apparatus shown in FIG. 2.
Figure 4:
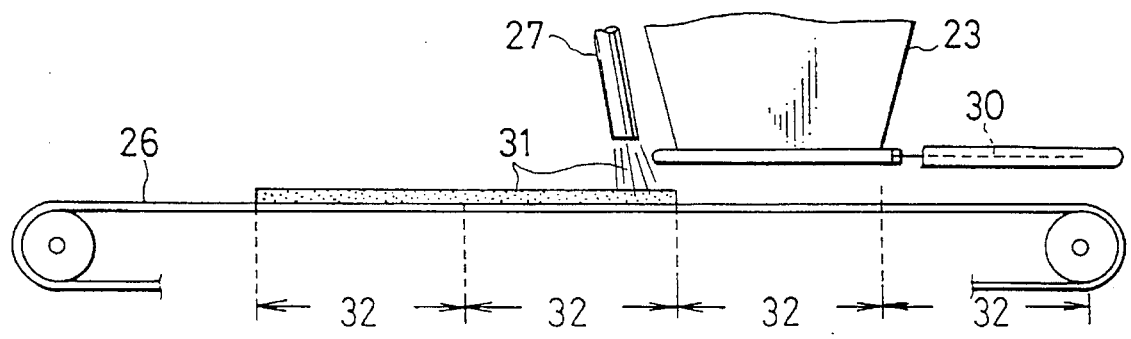
FIG. 4 illustrates a process step of the operation performed by the aggregate forming apparatus shown in FIG. 2.
Figure 5:
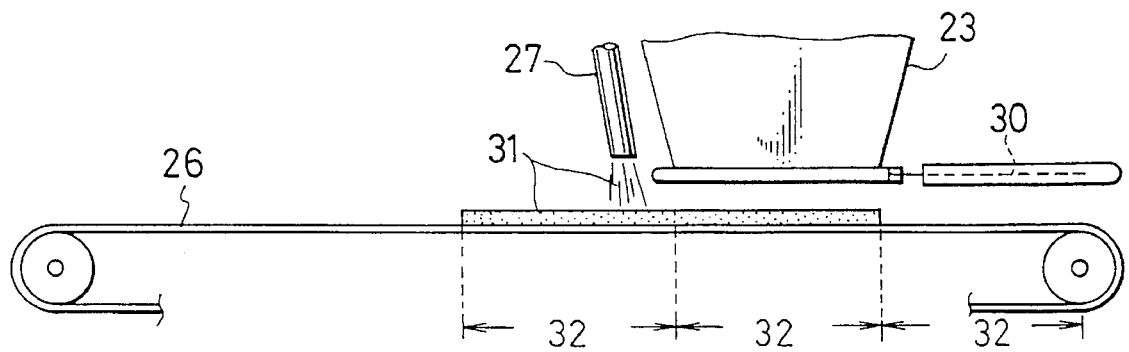
FIG. 5 illustrates a process step of the operation performed by the aggregate forming apparatus shown in FIG. 2.
Figure 6:
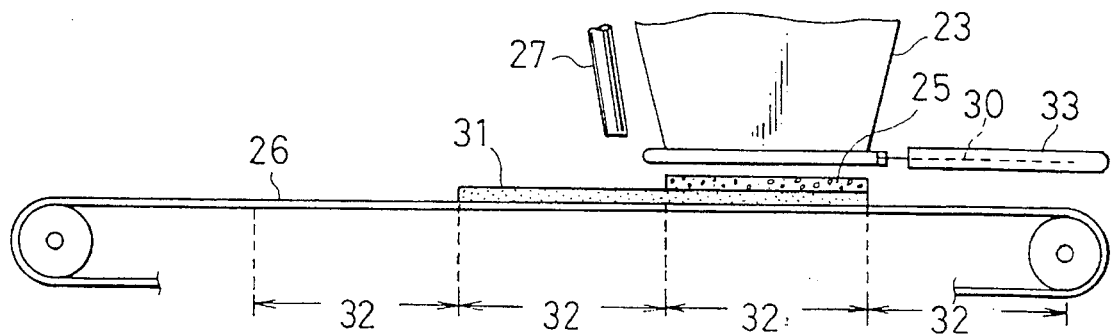
FIG. 6 illustrates a process step of the operation performed by the aggregate forming apparatus shown in FIG. 2.
Figure 7:
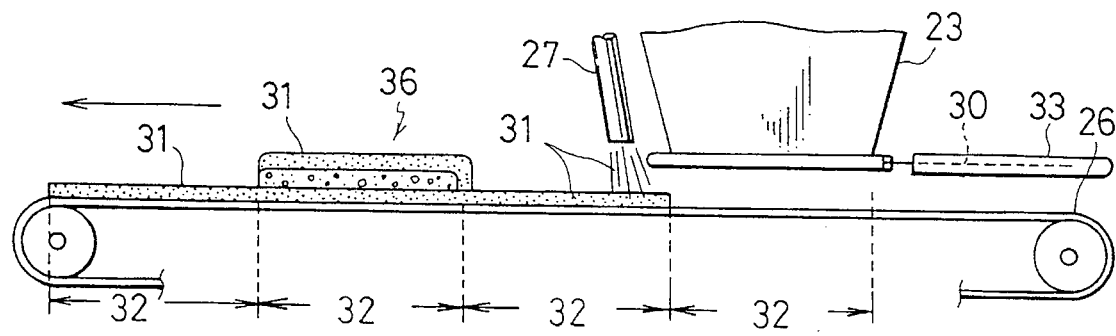
FIG. 7 illustrates a process step of the operation performed by the aggregate forming apparatus shown in FIG. 2.
Figure 8:
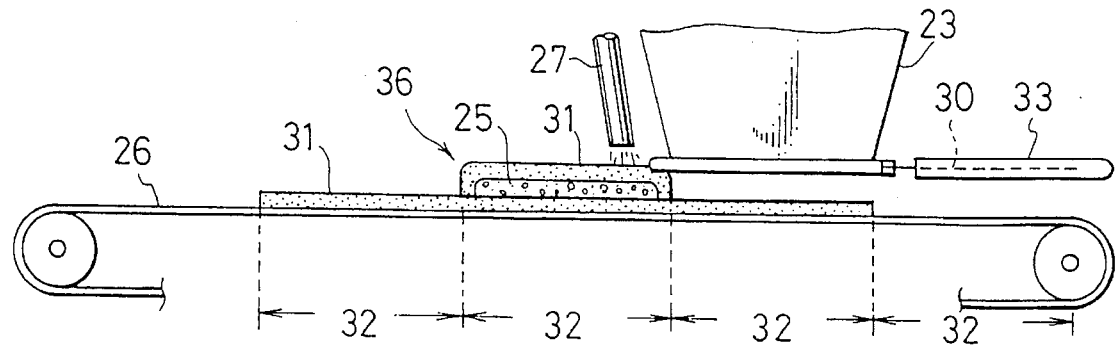
FIG. 8 illustrates a process step of the operation performed by the aggregate forming apparatus shown in FIG. 2.
Figure 9:
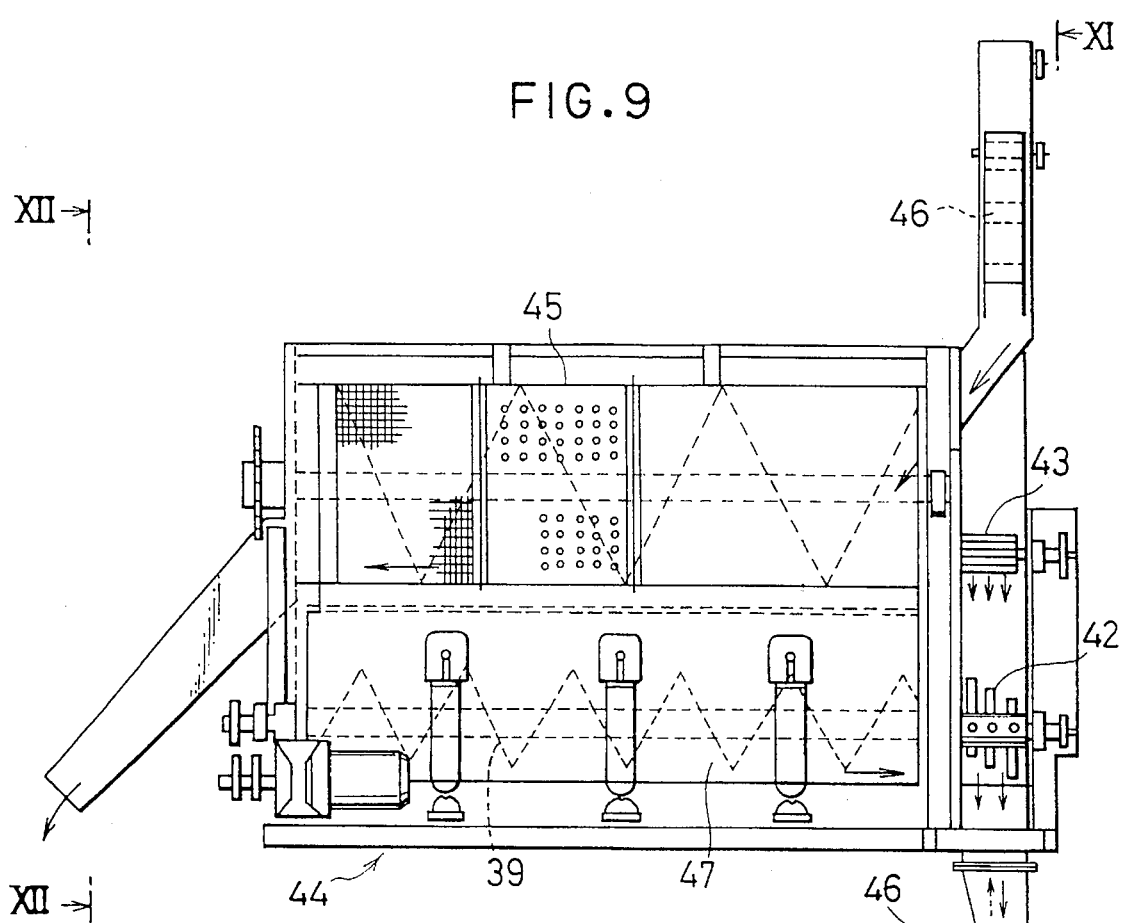
FIG. 9 is a front view of a dehydrated-cake granulating apparatus which is arranged stage subsequent to the apparatus shown in FIG. 2.
Figure 10:
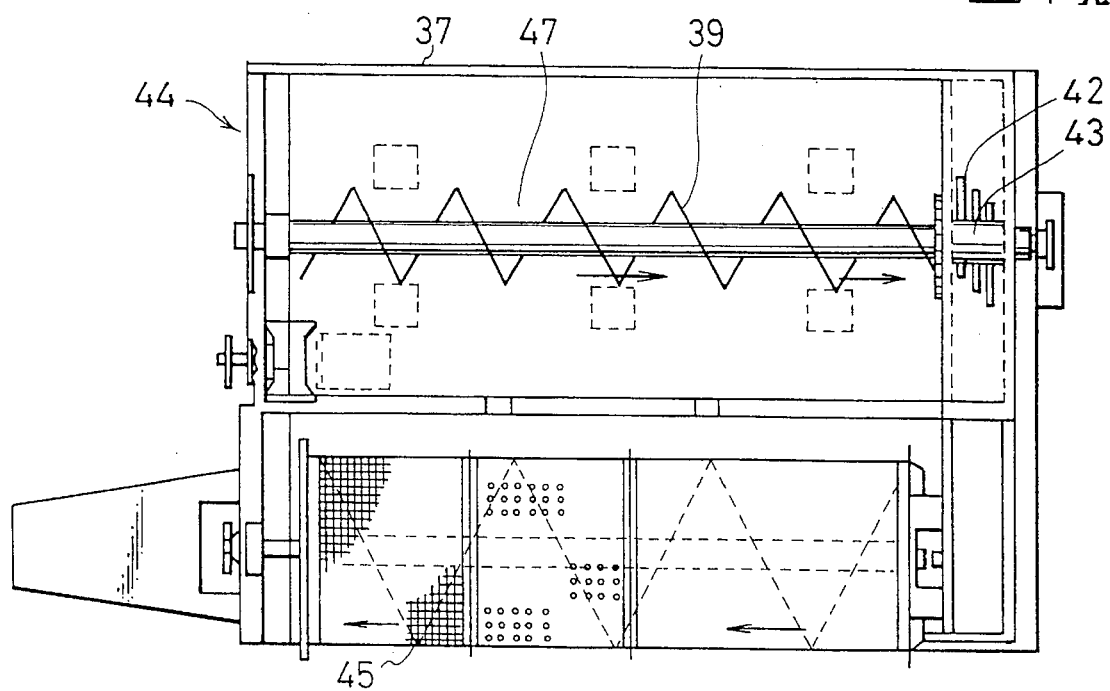
FIG. 10 is a top view of the apparatus shown in FIG. 9.
Figure 11:
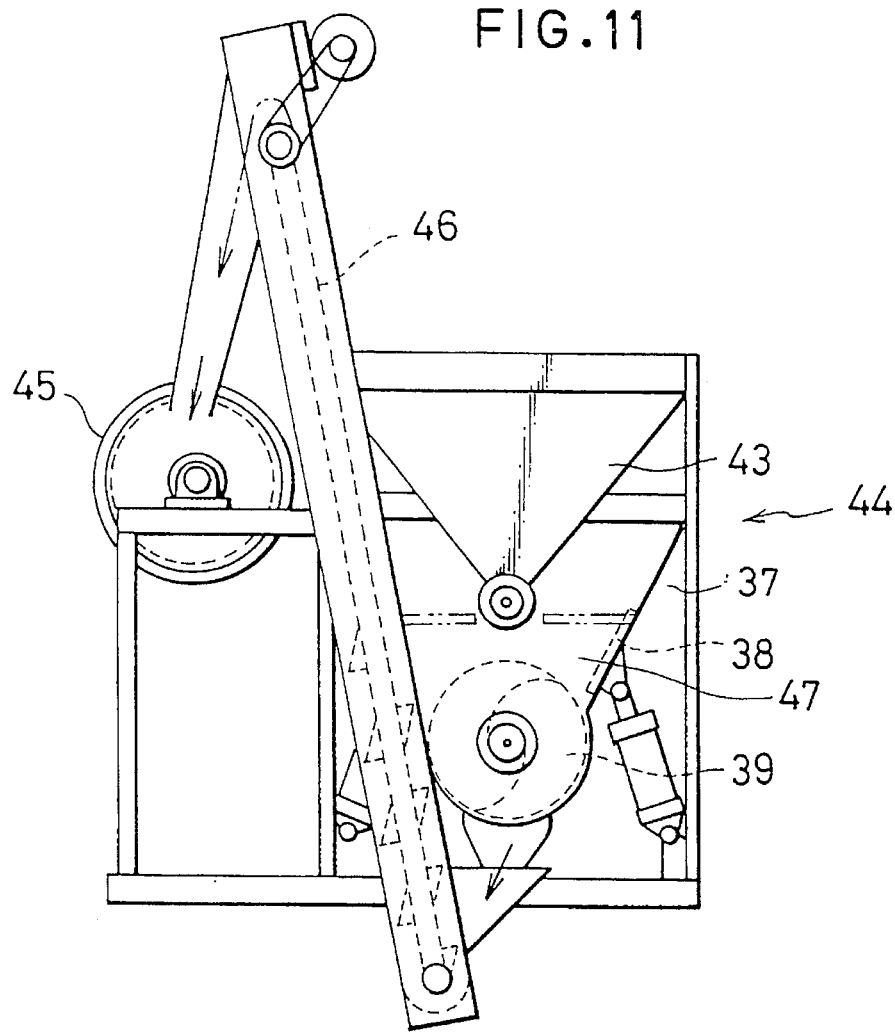
FIG. 11 is a sectional view along the line XI—XI of FIG. 9.
Figure 12:
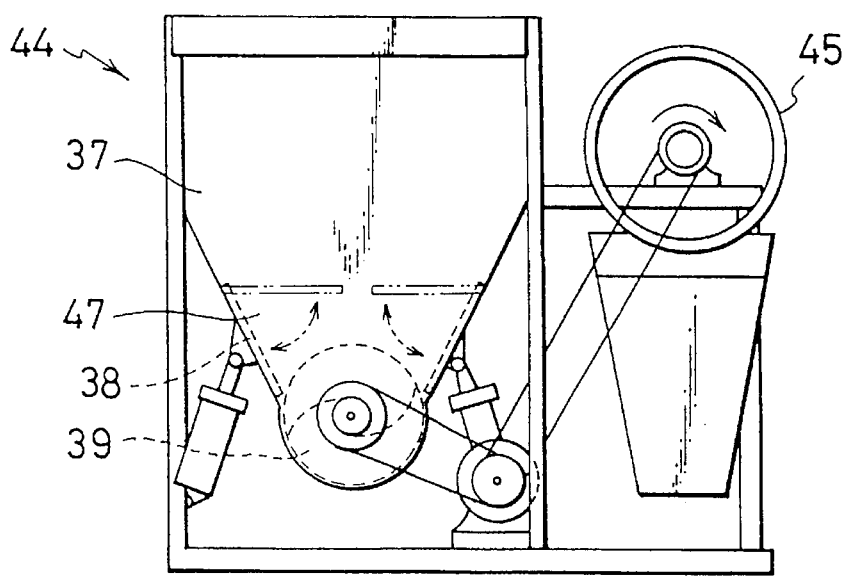
FIG. 12 is a sectional view along the line XII—XII of FIG. 9.

The operation of the foregoing apparatus will now be explained. Upon completion of dehydration, a movable plate 30 moves back and the dehydrator 16 temporarily stops when the applying pressure reaches approximately from 0 to 10 kg. Sensing this stoppage of the dehydrator 16, the belt conveyer 26 moves in the reverse direction for 3 or 4 seconds so as to be stopped (See FIG. 3). This reverse movement of the belt conveyer 26 is performed to remove the dripping filtration water upon completion of dehydration. Subsequently, the belt conveyer 26 performs one cycle of the movement, that is, it moves forward for two strokes and backward for one stroke (See FIGS. 4 and 5). In cooperation with this movement of the belt conveyer 26, the damper 29 arranged at the outlet of the powder spreader 27 is sure to be gradually opened. The duration for opening the damper 29 is adapted to match the duration required for one cycle of the belt conveyer 26. The damper 29 is fully opened and is successively closed. At this time, the dehydrated cake 25 is ready for dropping (See FIG. 5). Then, the process goes into a step of dropping the cake 25 (See FIGS. 6, 7 and 8). The belt conveyer 26 first goes ahead for one cycle as described above, and at this time, there is no cake 25 loaded on the belt conveyer 26. However, the powder 31 which has gone ahead of the cake 25 is spread into a storage vessel 33 before the cake 25 drops from the forward end of the belt conveyer 26.

Upon completion of the cake dropping step, a subsequent dehydration step follows, and then, the cake-dropping step is again performed. This process is repeated until the sludge generated for the same day is completely eliminated, thus completing a daily dehydration operation.

An explanation will now be given how the apparatus works to drop the cake 25. The first cake 25 is dropped onto the belt conveyer 26 via the hopper 24. The cutter 30, extended by the cylinder 33, vertically slices the cake 25 into bar-like pieces, which are then cut apart whenever necessary by the reciprocation of the cutter 30. Subsequently, the belt conveyer 26 moves for one cycle, while the cake powder is spread (See FIGS. 7 and 8). Then, a subsequent cake 25 is dropped onto the belt conveyer 26. The cutter 30 further reciprocates so as to allow the subsequent cake 25 to be cut apart and the cake 25 is laid on the belt conveyer 26. Such a step is repeated.

According to the present invention, the cake 25 is dropped onto the belt conveyer 26 from the filtration chamber 24 via the hopper 23 in such a way that the dropping distance is contained as small as possible so as to allow the cake 25 to retain its original shape. The cake 25 is vertically sliced by the cutter 30 for several times, and at the same time, the powder 31 is spread over the cake 25 from upward. That is, a sufficient amount of powder formed of the same material as the cake 25 is spread so as to prevent the cake 25 from melting, thereby significantly reducing the occurrences of sticking of the cake 25 to the apparatus. This also gives rise to the advantage of easily crushing the cake 25 into small pieces in the subsequent crushing process step. The powder-coated dehydrated cake produced according to the foregoing process is indicated by reference numeral 36.

FIGS. 9–12 show a crushing apparatus 44 for crushing the dehydrated cake 36. The crushing apparatus 44 is provided with a temporary storage vessel 37 for temporarily storing the powder-coated dehydrated cake 36. A double-door cake-receiving plate 38 for longitudinally opening outward is further arranged within the temporary storage vessel 37, thereby controlling the amount of the cakes 36 that are dropped. The cake-receiving plate 38 may be modified to be a slide-type plate so as to be slidably opened and closed. A ribbon screw conveyer 39 having a large movement of pitch is arranged below the cake-receiving plate 38. A cutter 42 having a plurality of teeth is arranged at the rear end of the ribbon screw conveyer 39, and a powder-spreading mechanism 43 is further arranged above the cutter 42 to spread cake powder from the upward direction. A trommel 45 is provided alongside the crushing apparatus 44 so that the cake 36 passing through the cutter 42 can be transferred to the trommel 45 by a bucket conveyer 46 or a screw conveyer (not shown).

The operations of the crushing apparatus 44 and the trommel 45 will now be described. The cake-receiving plate 38 is arranged to prevent the powder-coated dehydrated cakes 36 from dropping into the temporary storage chamber 37 at one time, otherwise a ribbon screw casing 47 would be completely filled with the dehydrated cakes 36. A certain time is allowed to leave the cakes 36 after being dropped into the temporary storage chamber 37 so that the progress of hardening the cake 36 due to hydration can be adjusted. The cake 36 is transferred by the ribbon screw conveyer 39 while being repeatedly agitated slowly little by little. The cake 36 is finely cut by the cutter 42. The cake powder is spread by the spreading mechanism 43 to prevent the cake 36 from melting and sticking to the apparatus. Further, the trommel 45 again mixes the cake 36 with the cake powder and further granulates and classifies the resultant cake 36, thereby automatically screening the cake particles by the particle size. Thus, granular cake suitable for recycling can be obtained.

As will be clearly understood from the foregoing description, the present invention offers the following advantages.

After the cake 36 provided with an agglomeration force obtained by the immediate dehydration process is stored in the temporary storage vessel 37, the progress of hardening the cake 36 caused by the hydration reaction is adjusted after a lapse of a few hours for leaving the resultant cake 36 in the storage vessel 37. Subsequently, the cake 36 is gradually supplied little by little by the ribbon screw conveyer 39, while controlling the opening amount of the receiving plate 38. The cake 36 is thus crushed into small particles, which are then rolled, thereby forming the crushed cake 36 into a spherical shape. The thus-shaped cake particles are coated with the cake powder to prevent the particles from sticking to each other. Then, the resultant cake 36 is further subjected to the granulation and classification by the trommel 45, thus obtaining the granular cake suitable for recycling.

What is claimed is:

1. A dehydrated cake disposing process comprising the steps of:

dehydrating uncured concrete sludge by dehydrator means, said uncured concrete sludge having an admixture removed therefrom;

slicing a dehydrated cake dropped from said dehydrator means;

coating the sliced dehydrated cake with cake powder;

allowing the powder-coated cake to be cured; and crushing the cured cake into granulation.

2. A dehydrated cake disposing apparatus for forming aggregate from raw uncured concrete sludge, comprising:

a pretreatment vessel for removing an admixture from said uncured concrete sludge;

dehydrator means for dehydrating the uncured concrete sludge having said admixture removed therefrom, said dehydrator means being arranged subsequent to said pretreatment vessel;

a cutter for slicing a dehydrated cake, said cutter being arranged below said dehydrator means;

a transfer device for transferring said dehydrated cake, said transfer device being arranged below said cutter; and a powder spreader arranged to correspond to the position of said dehydrated cake placed by said transfer device.

3. A dehydrated cake disposing apparatus for forming aggregate from uncured concrete sludge according to claim 2, wherein said transfer device is adapted to move forward for two strokes and to move backward for one stroke, the length of said one stroke is based on the size of a dehydrated cake placed on said transfer device.

4. An apparatus for forming aggregate of a dehydrated cake, comprising:

a storage vessel for temporarily storing a dehydrated cake so as to adjust hardening of said cake by hydration, said dehydrated cake having an admixture removed therefrom and being dehydrated and coated with cake powder;

a ribbon screw conveyer for crushing and transferring said dehydrated cake, said dehydrated cake having its hardening adjusted;

a cutter for cutting said dehydrated cake, said cutter being arranged at the rear end of said ribbon screw conveyor;

a powder spreader for spreading a cake powder, said powder spreader being arranged in a stage subsequent to said cutter; and a trommel for granulating and classifying, said trommel being arranged in a stage subsequent to said powder spreader.

* * * * *